W. R. PHILLIPS.
STORE FRONT AND SHOW CASE CONSTRUCTION.
APPLICATION FILED OCT. 20, 1911.

1,045,740.

Patented Nov. 26, 1912.

WITNESSES

INVENTOR
W. R. Phillips
BY
ATTORNEY

UNITED STATES PATENT OFFICE.

WILLIAM R. PHILLIPS, OF CRAFTON, PENNSYLVANIA, ASSIGNOR, BY DIRECT AND MESNE ASSIGNMENTS, OF ONE-THIRD TO ALFRED D. PHILLIPS, OF CINCINNATI, OHIO, AND ONE-THIRD TO JAMES L. ADAMS, OF CORAOPOLIS, PENNSYLVANIA.

STORE-FRONT AND SHOW-CASE CONSTRUCTION.

1,045,740.    Specification of Letters Patent.    Patented Nov. 26, 1912.

Application filed October 20, 1911. Serial No. 655,761.

*To all whom it may concern:*

Be it known that I, WILLIAM R. PHILLIPS, a citizen of the United States, residing at Crafton, in the county of Allegheny and State of Pennsylvania, have invented new and useful Improvements in Store-Front and Show-Case Construction, of which the following is a specification.

My invention relates to improvements in the construction of store-fronts and show-cases and has particular reference to the means for connecting and supporting the edges of the glass therein.

The principal object of my invention is to provide store-fronts, show-cases, or other articles to which it is adapted, with simple, reliable, and cheap corner and division bars.

Figure 1:
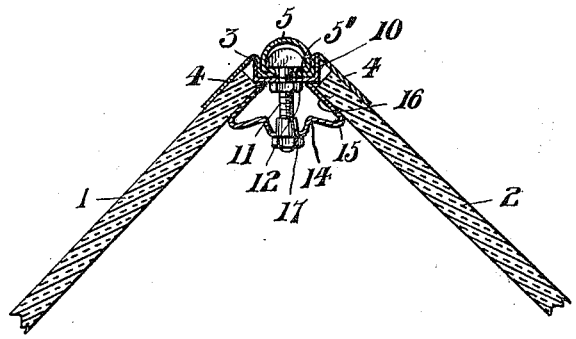
Figure 2:
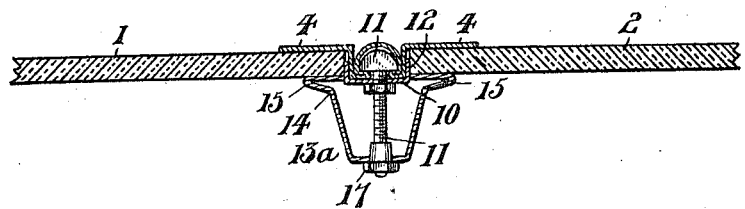
Figure 3:
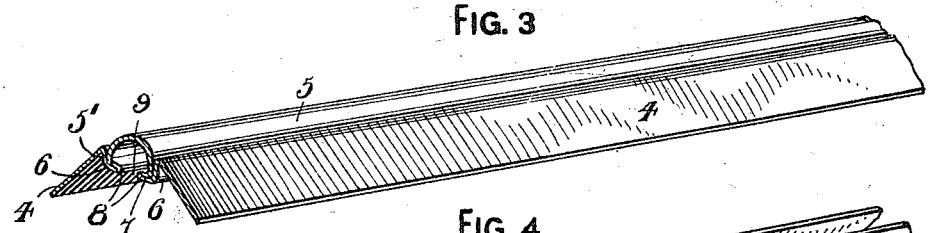
Figure 4:
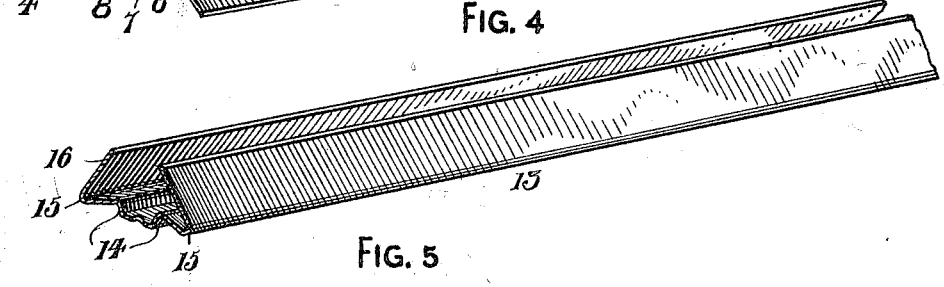
Figure 5:

Referring to the accompanying drawing, Figure 1 is a section taken across portions of two plates of glass connected and supported by my preferred form of corner bar. Fig. 2 is a section through portions of two plates of glass connected and supported by my preferred form of division bar. Fig. 3 is a perspective of the outer clamping member of the corner bar, and Fig. 4 is a perspective of the inner clamping member thereof. Fig. 5 is a perspective of my preferred form of clamping screw.

On Fig. 1 of the drawing, 1 and 2 designate two glass plates arranged at an angle and having two edges provided with a corner bar embodying the principles of my invention. The outer member 3 of my corner bar is integral from one edge to the other. It is composed of two flat lateral portions, or wings 4, a hollow bead or central portion 5, and connecting portions between the central portions and each wing. The wings are preferably flat and composed of a single layer of metal which rests against the outer faces of the glass plates 1 and 2, as shown on Fig. 1. The wings have, of course, the same angular relation to each other that the plates 1 and 2 have. At the inner side of each wing the member 3 is bent inwardly along the line or angle 5' so as to form the wall 6, preferably parallel with the plane bisecting the angle between the plates 1 and 2, or the wings 4. The bar 3 is bent at the inner edge of each wall 4 at substantially a right angle, the bent portions 7 extending toward each other to the bends 8, leaving a longitudinal space 9 between the said bends. At each of the bends 8, the bar 3 is bent outwardly and back upon the said portion 7 and the walls 6, thereby forming parallel flanges at each side of the said space 9. The bar 3 extends from one of the said flanges to the other so as to form the hereinbefore mentioned longitudinal hollow bead or central portion 5. A metal channel bar 10 preferably of steel lies between the adjacent edges of the glass plates 1 and 2 and has its flanges extending outwardly with their inner faces in engagement with the outer faces of the walls 6. The bottom of the channel supports the said inwardly bent portions 7 of the bar 3. The channel 10 prevents the spreading of the aforesaid flanges at the base of the bead 5 and forms a reinforcement for the bar 3 whereby the latter may be made of lighter metal than would be advisable if the channel were omitted. Bolts, only one, 11, being shown, having their elongated heads within the bead 5 and resting on the basal flanges therein extend through the channel 10, nuts, as 12, on the bolts being screwed against the outer face of the channel, thereby binding the bar 3 and the channel 10 firmly together. The flanges on the bar 3 are continuous so that the bolts 11 can clamp the bar 3 to the channel in all longitudinal positions of the bar 3 on the channel 10, thereby not requiring the bar 3 to be specially prepared at definite places for the bolt heads, which are shown sufficiently wide to rest on the basal flanges of the bar 3, and sufficiently long to prevent the rotation of the bolt. The inner member 13 of the corner bar has a general U-shape in cross-section, the edges of the member being bent outwardly at 14, and then inwardly at 15 toward each other so as to form the terminal flanges or wings 16 which have their outer faces in engagement with the inner faces of the plates 1 and 2 opposite the wings 4. The member 13 is arranged opposite the member 3 so that the bolts 11 may serve to connect the plates 1 and 2 and the members of the corner bar together, the sleeve nuts 17 (only one shown) being turned up against the outer face of the base portion of the member 13. The wings 4 and 16 are originally constructed so that, when the members have been adjusted to their final positions, the said wings will give a substantially even pressure along their width. The shape of the member 13 is seen to be such that when the nuts 17 are tightened the pressure is transmitted substantially to the wings 16 at a right angle thereto.

In Fig. 2 I have shown my invention in the form of a division bar, that is, as a connection between two plates of glass included between the same planes. The construction shown in Fig. 2 does not differ materially from that of Fig. 1. The wings 4 are in Fig. 2 necessarily between the same planes, as they must conform to the relative positions of the plates 1 and 2. The inner member 13ª has the bends 14 farther from the base thereof than they are in the member 13 so as to make the inward projection of the member 13ª as narrow as possible.

Although I have described my invention in detail, I do not desire to be limited to the details or their combination where the appended claims do not specifically require them to be so limited.

I claim—

1. In a store front or analogous construction, a pair of glass plates with adjacent edges, a channel-bar between the said edges, and an outer integral sheet metal member having wings bearing on the outer faces of the plates, and a central hollow bead seated in the channel and a pair of spaced continuous flanges at the sides of the bead and continuations of the flanges bent inwardly from the flanges and extending beneath the bead, in combination with an inner sheet metal U-shaped member and having wings bearing on the inner faces of the said plates, and bolts having their heads within the said hollow member and resting on the said continuations of the flanges, and their stems extending through the space between the said flanges and through the said channel and inner member.

2. In a store front or analogous construction, a pair of glass plates with adjacent edges, a channel-bar between the said edges, and an outer integral sheet metal member having wings bearing on the outer faces of the plates, and a central hollow bead seated in the channel, and a pair of parallel continuous flanges at the side of the bead and continuations of the flanges bent inwardly from the flanges and extending in the same plane beneath the bead, in combination with an inner sheet metal U-shaped member and having wings bearing on the inner faces of the said plates, and bolts having their heads within the said hollow member and resting on the said continuations of the flanges, and their stems extending through the space between the said flanges and through the said channel and inner member.

Signed at Pittsburgh, Pa., this 17th day of October, A. D. 1912.

WILLIAM R. PHILLIPS.

Witnesses:
ALICE E. DUFF,
F. N. BARBER.